United States Patent
Kakitsuba

(10) Patent No.: US 10,983,737 B2
(45) Date of Patent: Apr. 20, 2021

(54) INSTALLER CUSTOMIZING SYSTEM INCLUDING SERVER AND REQUESTING DEVICE, SERVER, AND METHOD OF CONTROLLING SERVER

(71) Applicant: BROTHER KOGYO KABUSHIKI KAISHA, Nagoya (JP)

(72) Inventor: Ryota Kakitsuba, Aichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/407,386

(22) Filed: May 9, 2019

(65) Prior Publication Data
US 2019/0354324 A1 Nov. 21, 2019

(30) Foreign Application Priority Data
May 16, 2018 (JP) .............................. JP2018-094373

(51) Int. Cl.
*G06F 3/12* (2006.01)
*G06F 8/61* (2018.01)
*G06K 15/02* (2006.01)

(52) U.S. Cl.
CPC .......... *G06F 3/1225* (2013.01); *G06F 3/1205* (2013.01); *G06F 3/1254* (2013.01); *G06F 3/1285* (2013.01); *G06F 3/1297* (2013.01); *G06F 8/61* (2013.01)

(58) Field of Classification Search
None
See application file for complete search history.

(56) References Cited

U.S. PATENT DOCUMENTS

| | | | | |
|---|---|---|---|---|
| 7,600,107 B2* | 10/2009 | Kato | ..................... | G06F 9/4411 713/1 |
| 7,890,925 B1* | 2/2011 | Wyatt | ....................... | G06F 8/20 717/106 |
| 2013/0138718 A1* | 5/2013 | Mallur | ................ | H04L 41/0803 709/203 |
| 2013/0246777 A1* | 9/2013 | Fukasawa | ............. | G06F 9/4401 713/1 |
| 2014/0063520 A1* | 3/2014 | Tarumi | .................. | G06F 9/4411 358/1.13 |
| 2015/0242195 A1 | 8/2015 | Omura | | |
| 2017/0060497 A1* | 3/2017 | Maezawa | ............. | G06K 15/005 |
| 2020/0034133 A1* | 1/2020 | Dattatri | ..................... | G06F 8/61 |

FOREIGN PATENT DOCUMENTS

JP 2014-035627 A 2/2014

* cited by examiner

*Primary Examiner* — Beniyam Menberu
(74) *Attorney, Agent, or Firm* — Scully, Scott, Murphy & Presser, PC

(57) ABSTRACT

An installer customizing system includes a server and a requesting device. The server is configured to perform receiving a print setting parameter to be associated with an installation package of an print software from the requesting device, obtaining the installation package, obtaining guarantee information guaranteeing a custom installation package which is the obtained installation package associated with the received print setting parameter, storing the custom installation package including the obtained guarantee information in a memory, and transmitting obtaining information enabling the requesting device to obtain the custom installation package stored in the memory to the requesting device.

21 Claims, 5 Drawing Sheets

FIRST DATABASE

| USER ID | INSTALLATION PACKAGE ID INFORMATION | PRINTER TYPE | PRINT SETTINGS | | | |
|---|---|---|---|---|---|---|
| | | | SHEET SIZE | ONE-SIDE/BOTH-SIDE | Nin1 | MONOCHROME/COLOR | |
| 001 | 00A | MFP-A | A4 | ONE-SIDE | 2in1 | MONOCHROME | ... |
| 002 | 00E | MFP-B | A4 | BOTH-SIDE | — | COLOR | ... |
| 003 | 00A | MFP-A | A4 | ONE-SIDE | 2in1 | MONOCHROME | ... |
| ... | ... | ... | ... | ... | ... | ... | ... |

FIG. 2A

SECOND DATABASE

| APPLIED PRINTER | INSTALLATION PACKAGE ID INFORMATION | PRINT SETTINGS | | | | THE NUMBER OF PROVISIONS |
|---|---|---|---|---|---|---|
| | | SHEET SIZE | ONE-SIDE/BOTH-SIDE | Nin1 | MONOCHROME/COLOR | |
| MFP-A | 00A | A4 | ONE-SIDE | 2in1 | MONOCHROME | 12 |
| | 00B | A3 | ONE-SIDE | — | MONOCHROME | 4 |
| | 00C | A4 | ONE-SIDE | 2in1 | COLOR | 1 |
| | 00D | A4 | BOTH-SIDE | 2in1 | MONOCHROME | 4 |
| | ... | ... | ... | ... | ... | ... |
| MFP-B | 00E | A4 | BOTH-SIDE | — | COLOR | 1 |
| | ... | ... | ... | ... | ... | ... |

FIG. 2B

INSTALLER CUSTOMIZING SYSTEM INCLUDING SERVER AND REQUESTING DEVICE, SERVER, AND METHOD OF CONTROLLING SERVER

CROSS-REFERENCE TO RELATED APPLICATIONS

This application claims priority under 35 U.S.C. § 119 from Japanese Patent Application No. 2018-094373 filed on May 16, 2018. The entire subject matter of the application is incorporated herein by reference.

BACKGROUND

Technical Field

The present disclosures relate to an installer customizing system including a server and a requesting device, a server, and a method of controlling the server.

Related Art

There has been known a technique of installing a printer driver in a PC. There has been known an OS of the PC configured to determine whether the printer driver to be installed in the PC is one which has passed a particular operation test. Such an OS is typically configured that, when it is determined that the printer driver to be installed is not one which has passed the particular operation test, the OS displays a message indicating the same on a display of the PC.

For use in association with the above-described OS, a vendor of the printer generally performs a particular operation test on a printer driver to be supplied, and provides a user of guarantee information guaranteeing that the printer driver has passed the particular operation test.

SUMMARY

There is a case where a user wishes to apply customizing (e.g., print settings such as setting of a size of printing sheets) to an installation package of the printer driver before installation, and install the customized installation package in the PC thereafter. In such a case, since the installation package has been modified before installation, the installation package does not match the guarantee information thereof. Then, the OS of the PC determines that the printer driver to be installed is not one which has passed the particular operation test and displays an indication on the display of the PC.

It is noted, however, when the user wishes to customize printer drivers of a plurality of PCs, an excess operation of customizing print settings in each of the plurality of PCs is necessary.

According to aspects of the present disclosure, there is provided an installer customizing system including a server and a requesting device connected to the server through the Internet. The server includes a memory and a controller. The controller is configured to perform receiving a print setting parameter to be associated with an installation package of print software from the requesting device, the print software being configured to cause an information processing device to perform a print instruction process for causing a printer to perform printing, the installation package being software aggregation configured to cause an information processing device on which an operating system is running to perform an installation process of installing the print software in the information processing device such that the print software operates on the operating system, the print setting parameter being associated with the print software in the installation process such that the print software operates in accordance with the print setting parameter, obtaining the installation package, obtaining guarantee information guaranteeing a custom installation package which is the obtained installation package associated with the received print setting parameter, the guarantee information including signature information indicating a guarantor guaranteeing the custom installation package, the guarantee information being not received from the requesting device when the print setting parameter is received from the requesting device, storing the custom installation package including the obtained guarantee information in the memory, and transmitting obtaining information enabling the requesting device to obtain the custom installation package stored in the memory to the requesting device through the Internet.

According to aspects of the present disclosure, there is provided a server includes a memory and a controller. The controller is configured to perform receiving a print setting parameter to be associated with an installation package of print software from a requesting device through an network, the print software being configured to cause an information processing device to perform a print instruction process for causing a printer to perform printing, the installation package being software aggregation configured to cause the information processing device on which an operating system is running to perform an installation process of installing the print software in the information processing device such that the print software operates on the operating system, the print setting parameter being associated with the print software in the installation process such that the print software operates in accordance with the print setting parameter, obtaining the installation package, obtaining guarantee information guaranteeing a custom installation package which is the obtained installation package associated with the received print setting parameter, the guarantee information including signature information indicating a guarantor guaranteeing the custom installation package, the guarantee information being not received from the requesting device when the print setting parameter is received from the requesting device, storing the custom installation package including the obtained guarantee information in the memory, and transmitting obtaining information enabling the requesting device to obtain the custom installation package stored in the memory to the requesting device through the Internet.

According to aspects of the present disclosure, there is provided a method of controlling a server. The method includes receiving a print setting parameter to be associated with an installation package of print software from a requesting device through the Internet, the print software being configured to cause an information processing device to perform a print instruction process for causing a printer to perform printing, the installation package being software aggregation configured to cause the information processing device on which an operating system is running to perform an installation process of installing the print software in the information processing device such that the print software operates on the operating system, the print setting parameter being a parameter associated with the print software installation process such that the print software operates in accordance with the print setting parameter, obtaining the installation package, obtaining guarantee information guaranteeing a custom installation package which is the obtained installation package associated with the received print setting parameter, the guarantee information including signature information indicating a guarantor guaranteeing the custom installation package, the guarantee information being not received from the requesting device when the print setting parameter is received from the requesting device, storing the custom installation package including the obtained guarantee information in a memory of the server, and transmitting obtaining information enabling the requesting device to obtain obtaining the custom installation package stored in the memory to the requesting device through the Internet.

BRIEF DESCRIPTION OF THE ACCOMPANYING DRAWINGS

FIG. 1 is a block diagram showing a functional configuration of a server and an information processing device according to an embodiment of the present disclosures.

FIG. 2A schematically shows contents of a first database.

FIG. 2B schematically shows contents of a second database.

DETAILED DESCRIPTION OF THE EMBODIMENT

Hereinafter, referring to the accompanying drawings, an embodiment according to the present disclosures will be described. It is noted that the embodiment described below is merely an illustrative embodiment and various modifications can be made within aspects of the present disclosures. For example, the order of execution of processes described later may be changed appropriately without changing aspects of the present disclosures.

Figure 1:
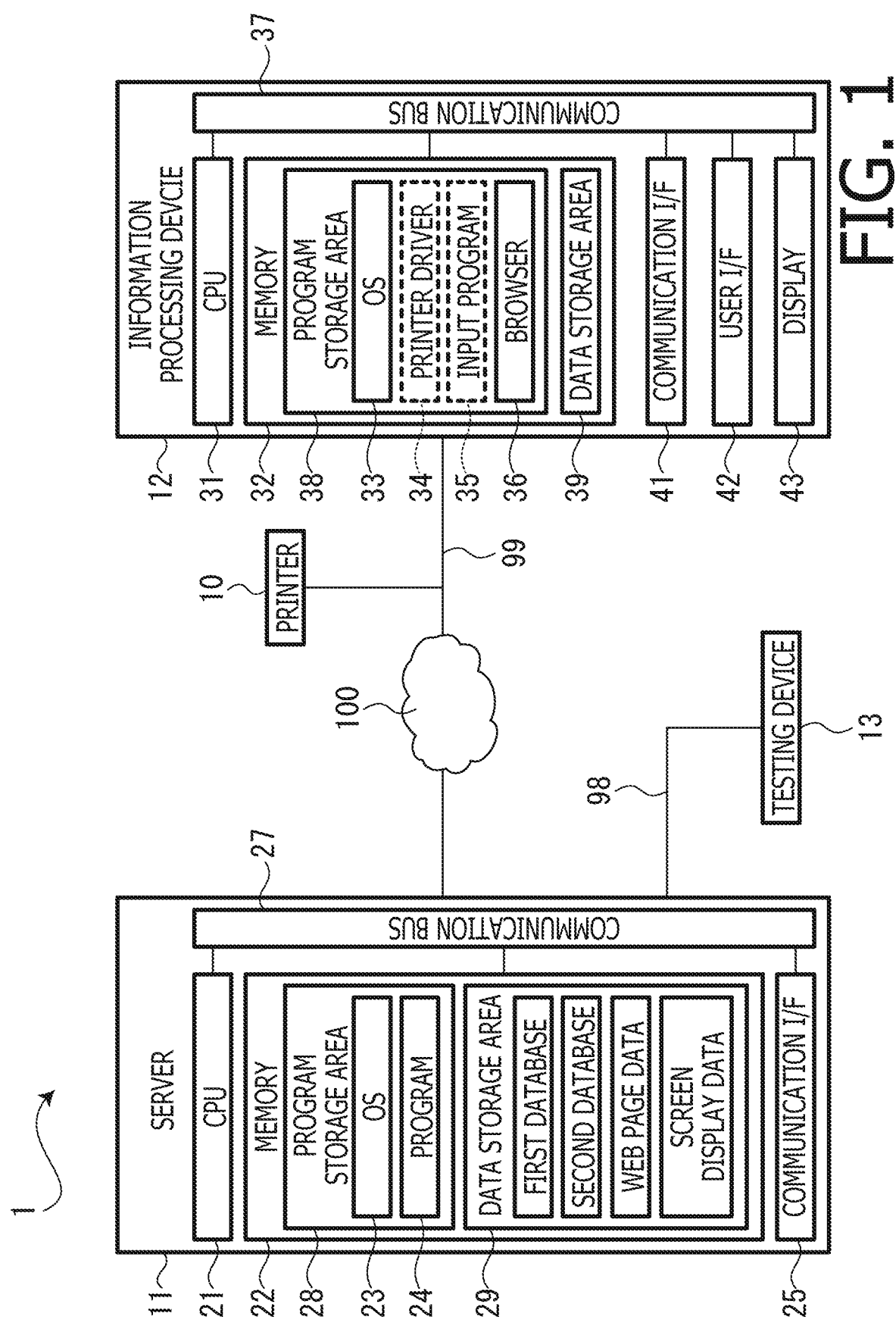

FIG. 1 shows an installer customizing system 1 of the embodiment according to the present disclosure. The installer customizing system 1 includes a server 11 and an information processing device 12. Firstly, the server 11 will be described. The server 11 is connected to the Internet 100. To the Internet 100, a local network 99 is connected through a relaying device such as a router (not shown). The information processing device 12, which may be a personal computer or a management server, and a printer 10 are connected to the local network 99. Typically, the local network 99 is an intranet configured, for example, inside a home office and/or a branch office, and is configured by a wireless LAN, a wired LAN, WAN and/or a combination thereof. In the example shown in FIG. 1, one information processing device 12 and one printer 10 are connected to the local network 99. However, this configuration is only an example and more than one information processing devices 12 and more than one printers 10 may be provided.

The information processing device 12 and the printer 10 mutually communicate through the local network 99 using a communication protocol such as TCP/IP. According to the illustrative embodiment, a printer driver 34 is to be installed in the information processing device 12. The printer driver 34 functions to input a print command to the printer 10 to cause the printer 10 to perform printing. The printer driver 34 is provided, by the server 11, to a user of the information processing device 12. That is, the server 11 is configured to perform a service of providing, for the user, the printer driver 34 to be installed in the information processing device 12. Concretely, the server 11 performs a service of providing, for the user, an installation package, with a signature, of a printer driver which has been customized in accordance with user-desired print settings. It is noted that the installation package is software aggregation including a printer driver, an installer for installing the printer driver, files to be loaded at a time of installation, image data representing images to be displayed on the display when the printer driver is installed and the like. The installation package includes information representing a printer in which the printer driver is to be installed. It is noted that the printer driver 34 is an example of print software configured to cause an information processing device to perform a print instruction process for causing a printer to perform printing. The print instruction process may include a process of accepting print setting, a process of generating print data based on the print setting, or a process of outputting a print command to cause the printer to perform printing of the print data. The information processing device may instruct the printer to perform printing of the print data by performing the print instruction process.

The server 11 is connected with the testing device 13 through a communication network 98. The communication network 98 may be a local network such as an intranet or the Internet. The testing device 13 is an information processing device such as a personal computer or a server. The testing device 13 is configured to perform an operation check of a printer driver with respect to an OS, and will be described in detail.

Hereinafter, the server 11, the information processing device 12 and the testing device 13 will be described in detail.

As shown in FIG. 1, the server 11 has a CPU 21, a memory 22, a communication I/F 25 and a communication bus 27. The CPU 21, the memory 22 and the communication I/F 25 are connected to the communication bus 25.

The communication I/F 25 is connected to the Internet 100. The server 11 is configured to communicate with the information processing device 12 through the communication I/F 25, the Internet 100, a firewall provided by the relaying device (not shown) and the local network 99. The server 11 is configured to communicate with the information processing device 12 using internet protocols such as http or https. Concretely, the server 11 receives an HTTP request from the information processing device 12 and transmits an HTTP response, which is a response to the received HTTP request, to the information processing device 12, thereby mutually communicating with the information processing device 12. The CPU 21 is an example of a controller.

The memory 22 includes at least one of, some of or all of a ROM, a RAM, an EEPROM, an HDD, a portable storage medium such as a USB memory and a buffer provided to the CPU 21. It is noted that the memory 22 may be a computer-readable storage medium. The computer-readable storage medium is a non-transitory medium. The non-transitory medium includes, in addition to the computer-readable storage medium above, a recording medium such as a CD-ROM, a DVD-ROM and the like. It is also noted that the non-transitory medium is a tangible medium. In contrast, an electrical signal carrying programs downloaded from a server on the internet 100 or the like is a computer-readable signal medium, which is one type of a computer-readable medium, but is not included in the non-transitory computer-readable storage medium. So are the memory 32 of the information processing device 12 (described later).

The memory 22 has a program storage area 28 and a data storage area 29. The program storage area 28 contains the OS 23 and other programs including a program 24.

The program 24 is a program which controls, in association with the OS 23, communication with the information processing device 12 through the communication I/F 25. The OS 23 is a basic program of the server 11. The program 24 may be a single program or an aggregation of a plurality of programs. The program 24 performs a process of providing the user of an installation package of the printer driver according to the user-desired print settings. The program 24 will be described in detail.

The data storage area 29 stores data which is necessary for execution of programs. Further, the data storage area 29 also stores a first database, a second database, Webpage data and screen display data.

The first database is a database indicating correspondence between users and installation packages. For example, as shown in FIG. 2A, the first database contains a plurality of items and a plurality of records. The plurality of items include items of "user ID", "installation package identification information", "printer type" and "print settings". The plurality of records are settings which are set in the plurality of items, respectively.

Figure 5:
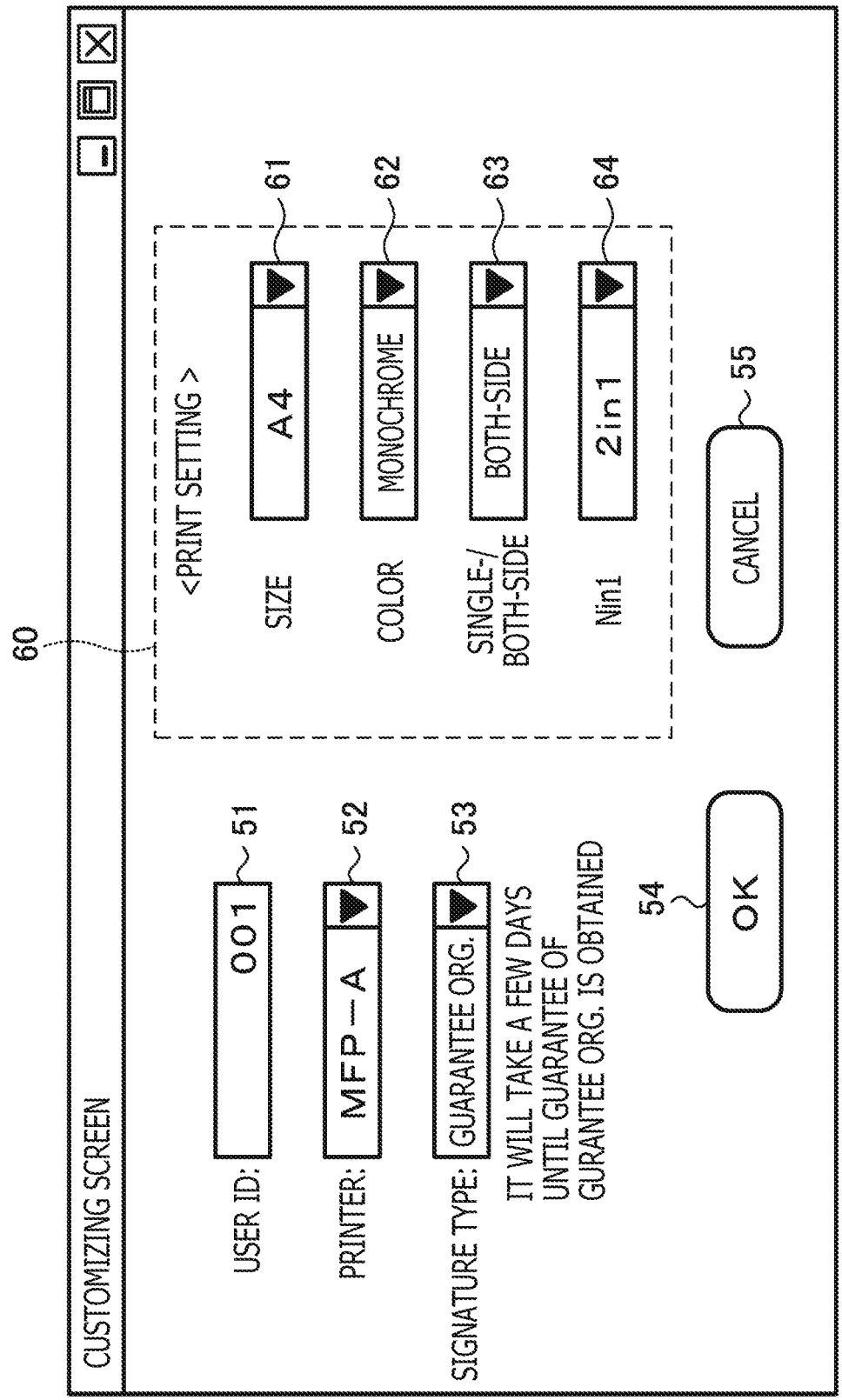
FIG. 5 shows an example of a customizing screen displayed on the information processing device.

The item "user ID" is information for identifying users. Each user is identified by the user ID. The user ID may be input by the user through a customizing screen as shown in FIG. 5, or the program 24 of the server 11 may issue automatically for each user. Each record is identified by the user ID. That is, for one user ID, one record is generated. The user ID is, for example, an alphanumerical character string.

The item "installation package identification information" is information referred to when the installation package is identified. The installation package includes settings (i.e., a record) set in the items "printer type" and "print settings". A plurality of installation packages are distinguished from each other based on the installation package identifying information. The program 24 of the server 11 adds the installation package identifying information to the generated installation package.

The item "printer type" indicates the printer 10 to which the printer driver installed by the installation package is applied. An example of the item "printer type" is a model name of the printer 10.

The item "print settings" includes a plurality of segmented sub-items such as "sheet size", "one-side/both-side", "N-in-1", "monochrome/color" and the like. The "print settings" may include items other than those indicated in FIG. 2A.

The sub-item "sheet size" indicates the size of the sheet on which the printer 10 is instructed to perform printing. For example, "A4" indicates a setting for instructing to print on a sheet having an A4 size (210 mm×297 mm).

The sub-item "one-side/both-side" indicates which of a one-side printing and a both-side printing is to be performed by the printer 10. The "one-side printing" indicates a printing method of performing printing only on one side of each sheet, while the "both-side printing" indicates a printing method of performing printing on both sides of each sheet.

The sub-item "N-in-1" is a setting of performing printing with collecting a plurality of pages (i.e., N pages) of contents on one page of printing sheet. For example, "2-in-1" indicates a setting that two pages of printing contents are collectively printed in one page of printing sheet.

The sub-item "monochrome/color" indicates a setting of a monochromatic printing or a color printing the printer 10 is to be instructed. The "monochrome" indicates that the printer 10 is to be instructed to perform the monochromatic printing, while the "color" indicates that the printer is to be instructed to perform the color printing.

The second database indicates correspondence between the installation packages indicated by the installation package identifying information and the number of supplies of the installation packages. As shown in FIG. 2B, the second database has a plurality of items and a plurality of records. The plurality of items include the items of "applied printer", "installation package identification information", "print settings" and "number of provisions".

The items "applied printer", "installation package identification information" and "print settings" of the second database are the same as the items "printer type", "installation package identification information" and "print settings" of the first database. Each record (combination of a setting in the item "applied printer" and settings in the item "print setting") of the second database is individually identified by the item "installation package identification information". That is, for one installation package identification information, one record is generated.

The item "number of provisions" indicates the number of times when the respective installation packages are provided to the users. For example, the installation packages indicated by the installation package identification information "00A" are provided to twelve users including users whose user ID's are "001" and "003" in the first database (see FIG. 2A). It is noted that the item "number of provisions" is used as analysis information when a new printer driver is released, which will be described in detail later.

The Webpage data is data published on the Internet and identified by URL. The user can request an installation package of a printer driver through the published Webpage.

The screen display data is data transmitted to the information processing device 12 in response to a request for the installation package by the user through the Webpage. The screen display data includes screen data representing a customizing screen (see FIG. 5) and a displaying program including, for example, JavaScript®. The displaying program functions to modify the customizing screen in accordance with user input through the customizing screen.

The information processing device 12 includes a CPU 31, a memory 32, a communication I/F 41, a user I/F 42, a display 43 and a communication bus 37. The CPU 31, the memory 32, the communication I/F 41, the user I/F 42 and the display 43 are connected to the communication bus 37. The CPU 31 is an example of a computer and a controller of a requesting device.

It is noted that configurations of the CPU 31, the memory 32, the communication I/F 41 and the communication bus 37 are the same as those of the CPU 21, the memory 22 and the communication bus 27 of the server 11.

The communication I/F 41 is a LAN I/F or a wireless LAN I/F and is connected to the local network 99. The information processing device 12 is configured to communicate with the printer 10 through the communication I/F 41 and the local network 99, and communicate with the server 11 through the communication I/F 41, the local network 99, a firewall provided by the relaying device and the Internet 100.

The display 43 is an LCD, an OLED or the like, and has a displaying screen configured to display various pieces of information.

The user I/F 42 includes a keyboard, a mouse and the like. The user can input information and commands through the user I/F 42.

The memory 32 has a program storage area 38 and a data storage are 39. The program storage area 38 stores an OS 33, a browser 36 and the like. The OS 33 is a basic program of the information processing device 12. The OS 33 may be, for example, an operating system such as MacOS®, Windows®, Linus®, Android® OS. The browser 36 is a program configured to download image data such as Webpages published on the Internet 100 and display the same on the display 43.

The memory 32 is configured to store the printer driver 34 which is to be installed in the information processing device 12 by the installation package. An input program 35 shown in FIG. 1 will be described when a first modification of the illustrative embodiment is described.

The testing device 13 has the same configuration as that of the information processing device 12. Therefore, the testing device 13 has a CPU, a memory, a communication I/F, a user I/F, a display and a communication bus (not shown) which are the same as the CPU 31, the memory 32, the communication I/F 41, the user I/F 42, the display 43 and the communication bus 43 of the information processing device 12. It is noted that the memory of the testing device 13 stores an operation checking program which performs an operation check of printer drivers. The operation checking program is configured to perform an operation check of the installation package transmitted from the server 11, and outputs a test log indicating a result of the operation check. Detailed description will be provided later.

In the present specification, processes of the CPU in accordance with commands/instructions described in programs will basically described. Thus, processes indicated by terms "determine", "extract", "select", "calculate", "judge", "identify", "obtain", "receive", "control", and "set" are the processes of the CPU. It is noted that the processes executed by the CPU include a hardware control through a controller such as the OS. It is further noted that the term "obtain" will be used to mean a concept in which a request is not necessary. That is, a process in which the CPU receive data without requesting for the same is included in a concept that the CPU obtains the data. Further, a term "data" in the specification is represented by a computer-readable bit array. A plurality of pieces of data having substantially the same meaning/contents but different formats will be treated as the same data. A term "information" used in the specification will be treated in the same manner. Further, the processes of "instruct", "respond" and "request" are executed by communicating information/data indicating "instruct", "respond" and "request", respectively. Further, terms "instruct", "respond" and "request" may be used to indicate merely information representing "instruct", "respond" and "request".

It is noted that processes of the CPU 21 in accordance with instructions described in programs may occasionally be expressed in a simplified manner. For example, expressions such as "the CPU 21 performs", "the program 24 performs", "the server 11 performs" and the like may be used. So are the expressions regarding processing of the CPU 31. Further, input/output of information performed by programs through the communication I/F and/or user I/F may also occasionally be expressed in a simplified manner. For example, expressions such as "the CPU 21 receives", "the program 24 transmits" and "the server 11 obtains" and the like may be used.

Furthermore, a process of the CPU determining whether or not information A indicates a matter B may occasionally be expressed conceptually such that the CPU determines "whether a matter B or not based on information A".

Similarly, a process of the CPU determining whether information A indicates a matter B or a matter C may occasionally be expressed conceptually such that the CPU determines "whether a matter B or a matter C based on information A".

Throughout the specification, the terms "data" and "information" are common in regard to a point that both the data and information is a bit or a bit string which can be processed by the computer. It is noted that the "data" particularly indicates the bit or the bit string which the computer can deal without recognizing meanings represented by the bit or bit string. In contrast, the "information" particularly indicates the bit or the bit string of which meaning causes the operation of the computer to diverge. Further, a "command" is a control signal transmitted to a certain device to encourage a next operation, and the command may include information, or the command itself may have a nature of information.

It is also noted that, even though a format of the "data" or the "information" (e.g., a text format, a binary format, a flag format) is different among different computers, as far as the "data" or the "information" in the different computers are recognized to have the same meaning, the "data" or the "information" is treated as the same "data" or the same "information" among the computers. For example, information indicating "two" could be stored as a text string of "0x32" (ASCII code) in one computer, while stored as "10" (binary information) in another computer.

It is further noted that the above-mentioned distinction between "data" and "information" should not be too strict, but they could be treated exceptionally. For example, "data" may be temporarily treated as "information" or "information" may be temporarily treated as "data". Further, "data" in one device may be treated as "information" in another device, and vice versa. Furthermore, "information" could be extracted from "data" or "data" could be extracted from "information".

It is noted that an expression "in response to" means that, when a condition described after the expression is fulfilled, a process described before the expression is performed. It is noted that a timing when the process is performed need not be limited to be immediately after fulfillment of the condition but could be any time after the condition is fulfilled.

Next, referring to FIGS. 3-5, a controlling process performed by the program 24 of the server 11 will be described.

The user starts up the browser 36 of the information processing device 12, and the server 11 causes the display 43 to display a Webpage published on the Internet 100. The user inputs a request for an installation package of a printer driver of which print settings have been changed and a signature is added (hereinafter, such an installation package will also be referred to as a custom installation package) through the Webpage displayed on the display 43. The request (hereinafter, referred to as a custom request) is transmitted from the information processing device 12 to the server 11 as an HTTP request.

When the controlling process starts, the program 24 determines whether an HTTP request including the custom request is received (S11). When it is determined that the HTTP request including the custom request is received (S11: YES), the program 24 transmits an HTTP response including screen display data stored in the memory 22 to the information processing device 12 (S12). It is noted that the process of S12 to transmit the HTTP response including the screen display data to the information processing device 12 is an example of a transmitting operation of screen data of a parameter input screen, a transmitting operation of screen data of a printer driver selection screen and a transmitting operation of screen data of a guarantor selection screen. The information processing device 12 transmitting the HTTP request including the custom request is an example of a requesting device.

In response to receipt of the HTTP response including the screen display data from the server 11, the browser 36 of the information processing device 12 displays screen data included in the screen display data on the display 43. That is, the browser 36 displays the customizing screen shown in FIG. 5 on the display 43. It is noted that the customizing screen is an example of a parameter input screen, a printer driver selection screen and the guarantor selection screen.

Next, the user input the print setting parameters and the like through the customizing screen. The customizing screen includes a text box 51 receiving user input of a user ID, a pulldown menu 52 enabling the user to select a type of the printer 10, a pulldown menu 53 enabling the user to select a type of signature, an "OK" icon 54 and a "CANCEL" icon 55.

The user obtains, in advance, the user ID using, for example, the Webpage. In response to receipt of a request for issuance of the user ID through the Webpage, the program 24 of the server 11 generates the user ID and transmits the same to the information processing device 12. Alternatively, a user ID (e.g., a customer code) which has already been assigned to the user by contract may be used. The user can input the user ID in the text box using the user I/F 42.

The user can select the type of the printer 10 using the pulldown menu 52. The type of the printers shown on the pulldown menu 52 are displayed by a displaying program (e.g., JavaScript) included in the screen display data. The user can select one of the plurality of types of printers listed on the pulldown menu. The types of the printers may be, for example, model names of the printers. In the example shown in FIG. 5, a mode "MFP-A" is selected.

The displaying program included in the screen display data displays a print setting screen 60 on the customizing screen in response to selection of the type of the printer 10. For example, the print setting screen 60, which is shown in FIG. 5, is not displayed on the customizing screen until the type of the printer is selected. A process, by the displaying program, of generating data for displaying the print setting screen 60 is an example of a generating operation of the screen data of the parameter input screen.

The print setting screen 60 includes a plurality of setting items for changing print setting parameters. In the example shown in FIG. 5, setting items of "sheet size", "color", "one-side/both-side" and "N-in-1" are displayed. The print setting screen 60 includes pulldown menus 61-64 for selecting values of the print setting parameters. Specifically, the pulldown menu 61 displays selectable sheet sizes such as "A4", "A5" and the like. The pulldown menu 62 displays "monochrome" and "color" as selectable parameters. The parameter "monochrome" corresponds to a monochromatic printing and the parameter "color" corresponds to a color printing. The pulldown menu 63 displays "one-side" and "both-side" as selectable parameters. The parameter "one-side" corresponds to the one-side printing and the parameter "both-side" corresponds to the both-side printing. The pulldown menu 64 displays "2 in 1" and "4 in 1" as selectable parameters. The parameter "2 in 1" corresponds to printing of two pages of image data on one page, and the parameter "4 in 1" corresponds to printing of four pages of image data on one page. It is noted that kinds of the setting items to be displayed and parameters displayed in the pulldown menus 61-64 are determined by the displaying program.

The displaying program includes, for each printer type, the setting items to be displayed and definition data indicating default values of print setting parameters corresponding to respective setting items. The definition data has the same contents as definition data each printer driver contains. That is, the displaying program includes the setting items the same as the setting items which can be set by the printer driver in the print setting screen 60. For example, when a printer configured to perform printing only on A4 size printing sheets, only the parameter "A4" is displayed in the pulldown menu 61. That is, the displaying program includes the setting items which can be set to the selected printer in the print setting screen 60, while does not include the setting items which cannot be set to the selected printer in the print setting screen 60. Therefore, setting items which cannot be set to the selected printer are not displayed on the display 43. Such a configuration prevents the user from requesting for the custom installation package with wrong print settings including setting item(s) which cannot be set to the selected printer.

Further, the definition data defines a settable range or an unsettable range of each print setting parameter. For example, when a certain printer does not have a function to perform the both-side printing on an A5 size printing sheet, the definition data the printer driver corresponding to the printer is configured such that, in the items "size" and "one-side/both-side", a selection of "A5" and "both-side" is not allowed. Alternately, the definition data is configured such that only a selection of "A4" and "both-side", a selection of "A4" and "one-side" and a selection of "A5" and "one-side" are allowed. Accordingly, the displaying program, which has the definition data including the same contents of the definition data of the printer driver, displays the pulldown menus 61-64 such that only the settable range of values are indicated for respective print setting parameters.

For example, given that the definition data is configures as above, when "A5" is selected in the pulldown menu 61, the displaying program displays, in the pulldown menu 63, only "one-side" or both "one-side" and "both-side" with "both-side" being grayed out so that the user cannot select "both-side" from the pulldown menu 63. Alternatively, the displaying program remains "both-side" being displayed on the pulldown menu 63, but in response to user selection of "A5" from the pulldown menu 61 and "both-side" from the pulldown menu 63, the displaying program may display an error message notifying that selection of "A5" and "both-side" is not available for the currently selected printer on the customizing screen. According to the above configuration, it is prevented that the print settings are done with the unsettable parameter ranges for the currently selected printer. As a result, it is prevented that the user requests for the custom installation package with inappropriate print settings.

The definition data is included in the displaying program by the program 24 of the server 11. The memory 22 of the information processing device 12 stores a plurality of pieces of definition data which a plurality of printer drivers respectively have. The program 24 of the server 11 includes the plurality of pieces of the definition data stored in the memory into the displaying program. Alternatively, the memory 22 of the information processing device 12 stores the plurality of kinds of definition data, and the program 24 of the server 11 includes the plurality of kinds of definition data stored in the memory 22 in the displaying program and in the respective printer drivers. According to the above configuration, the content of the definition data the displaying program has and the content of the definition data the printer driver has are coincide with each other. In other words, the program 24 of the server 11 is configured to include the definition data of which content is the same as the content of the definition data the printer driver has into the displaying program.

The user selects the type of signature using the pulldown menu 53. The displaying program displays "guarantor" and "vendor" on the pulldown menu 53 and receives the user's operation to select the same.

The "guarantor" is an organization who guarantees that the printer driver 34 operates normally on the OS. The guarantor may be the vendor of the OS, or an organization authorized by the vendor of the OS. An example of the organization authorized by the vendor of the OS is, for example an organization such WHQL authorized by Microsoft.

The "vendor" is a vendor of the printer 10 and indicates a plurality of selectable parameters referring to the pulldown menu. When the user requests for the custom installation package guaranteed by the guarantor, the user selects the "guarantor" using the pulldown menu. When the user requests for the custom installation package guaranteed by the vendor of the printer 10, the user selects the "vendor" using the pulldown menu. The custom installation package guaranteed by the guarantor, or the custom installation package guaranteed by the vendor will be described later. It is noted that the guarantor is an example of a first guarantor, and the vendor is an example of a second guarantor.

When the "guarantor" is selected form the pulldown menu 53, the displaying program displays character strings indicating "It will takes a few days until guarantee of the guarantee organization is obtained" on the display 43. Although not shown in FIG. 5, when the "vendor" is selected form the pulldown menu 53, the displaying program displays character strings indicating "guarantee by the vendor will take a few minutes—several ten minutes" on the display 43.

The character strings "It will takes a few days until guarantee of the guarantee organization is obtained" mean it will take a few days until the user receives the custom installation package the user has requested. The character strings "guarantee by the vendor will take a few minutes—several ten minutes" it will take a few minutes to several tens of minutes until the user receives the custom installation package the user has requested. It is noted that the period of "a few days" is an example of a first period. Further, a period of "a few minutes—several tens of minutes" is an example of a second period.

When the user wishes to obtain the custom installation package guaranteed by the guarantee organization even though the user needs to await for a few days, the user selects the "guarantor" from the pulldown menu 53. When the user wishes to obtain the custom installation package earlier, the user selects the "vendor" from the pulldown menu 53. It is noted that the printer driver installed by the installation package guaranteed by the guarantee organization and the printer driver installed by the installation package guaranteed by the vendor are identical, which will be described in detailed later. It is noted that the custom installation package guaranteed by the guarantee organization and the custom installation package guaranteed by the vendor are different by their guarantee information (described later). As a result, when the printer driver is installed in the information processing device 12 using the custom installation package guaranteed by the vendor, a message indicating "This program is not guaranteed. Do you wish to continue installation?", an "OK" icon and a "CANCEL" icon are displayed on the display 43. The message means that it is not guaranteed that the printer driver using the custom installation package guaranteed by the vendor operates normally on the OS. In contrast, when the installation is performed using the custom installation package guaranteed by the guarantee organization, since the printer driver is guaranteed to operate normally on the OS, such an indication does not take place.

After inputting the user ID, selecting the type of the printer, selecting the print setting parameters of respective setting items and selecting the type of signature, the user selects the "OK" icon. In response to selection of the "OK" icon, the browser 36 of the information processing device 12 transmits an HTTP request including the user ID, the printer type, the print setting parameters and the type of signature to the server 11.

Figure 3:
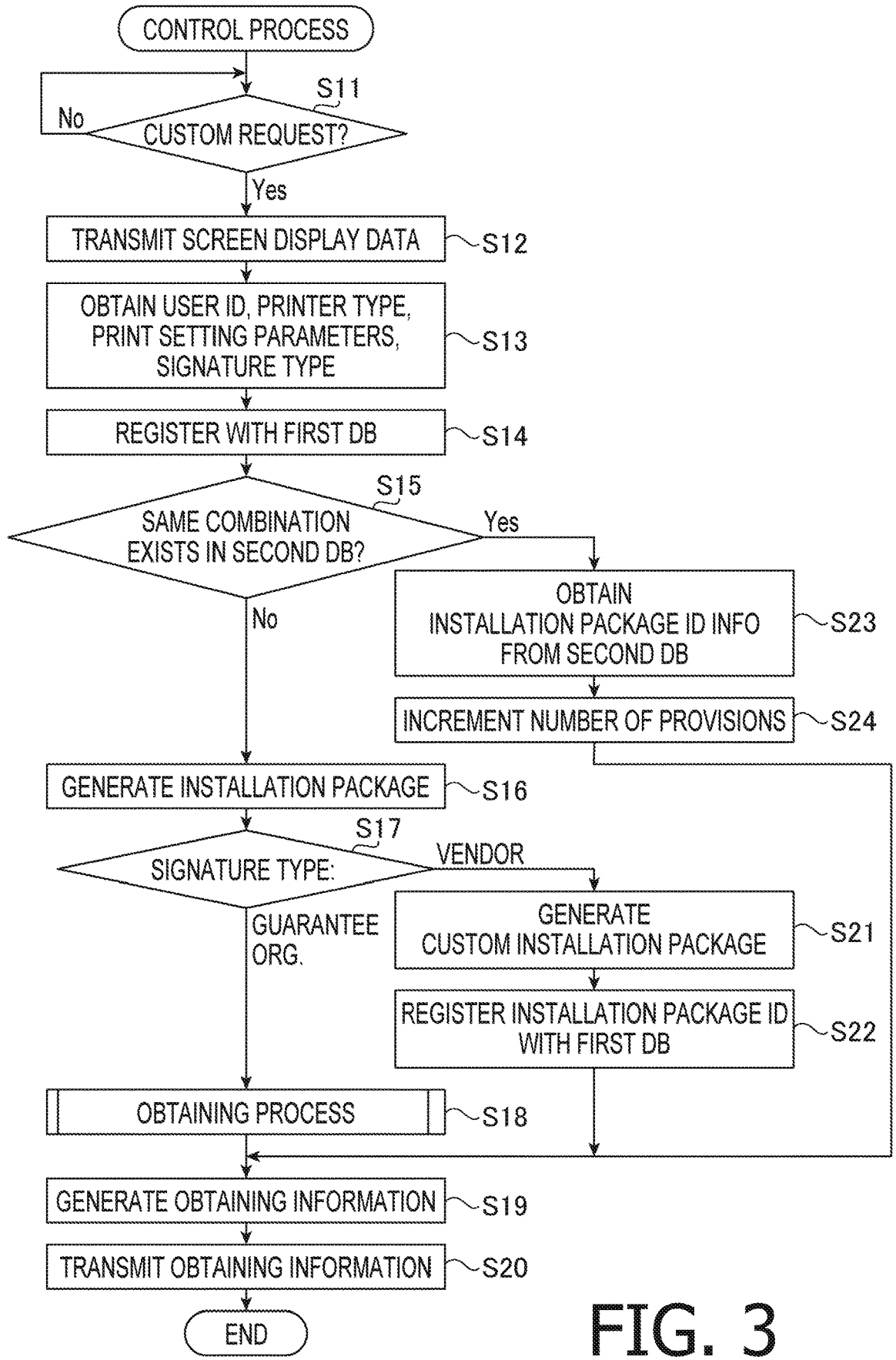
FIG. 3 is a flowchart illustrating a controlling process performed by the server shown in FIG. 1.
Figure 4:
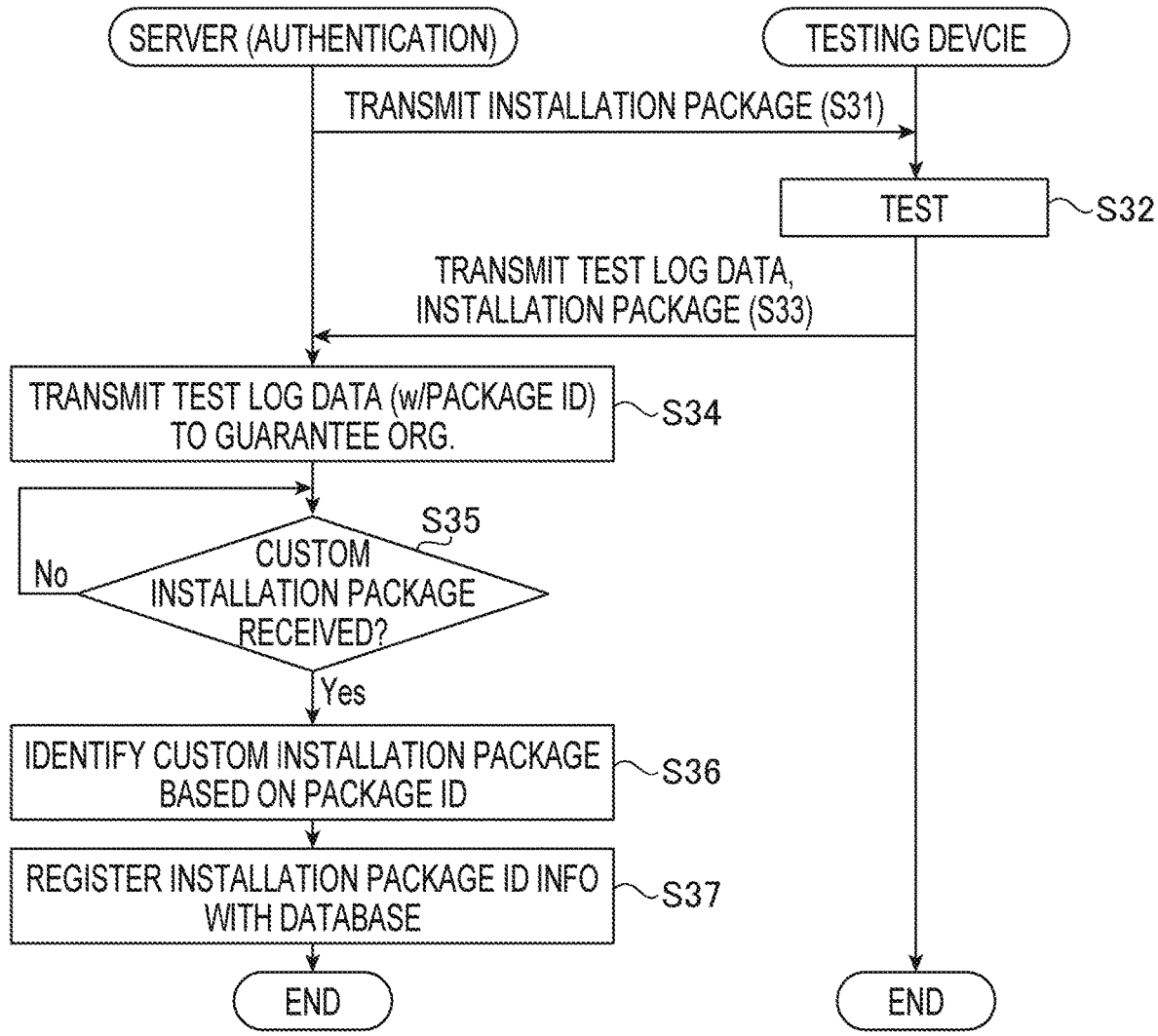
FIG. 4 is an operation chart showing an obtaining process of an installation package including guarantee information.

As shown in FIG. 3, the program 24 of the server 11 receives the HTTP request including the user ID, the printer type, the print setting parameters and the type of signature transmitted by the information processing device 11 (S13). It is noted that the process of S13 is an example of a receiving operation of a print setting parameter.

The program 24 of the server 11 generates a new record containing the user ID, the printer type and the print setting parameters included in the received HTTP request in the first database (S14). Next, the program 24 determines whether there is a record having a combination of the printer type and print setting parameters same as the combination included in the received HTTP request in the second database (S15). The process in S15 is an example of a determining operation of a print setting parameter.

When it is determined that there is no record having the combination of the printer type and print setting parameters same as the combination included in the received HTTP request in the second database (S15: NO), the program 24 of the server 11 generates an installation package which is an installation package of a printer driver corresponding to the printer type included in the received HTTP request and is associated with the combination of the print setting parameters included in the received HTTP request (S16). Concretely, the program 24 of the server 11 generates the installation package including a catalogue file indicating the combination of the print setting parameters included in the received HTTP request. The process of generating the installation package in S16 is an example of an obtaining operation of the installation package.

It is noted that the guarantee information is not included in the catalogue file of the installation package generated in S16. The guarantee information is information including signature information indicating the signature of the guarantor who guarantees the operation of the printer driver installed in the information processing device 12 with use of the installation package.

Next, the program 24 of the server 11 determines whether the signature type included in the received HTTP request indicates the guarantee organization or the vendor (S17). When it is determined that the signature type included in the received HTTP request indicates the guarantee organization (S17: guarantee organization), the program 24 performs an obtaining process of obtaining the custom installation package including the guarantee information of the guarantee organization (S18).

Hereinafter, referring to FIG. 4, the obtaining process will be described. The program 24 of the server 11 transmits the installation package generated in S16 to the testing device 13 and instructs the operation check program of the testing device to perform an operation check of the printer driver which is included in the installation package (S31). It is noted that the process of S31 is an example of an executing operation of operation check or an instructing operation of execution of the operation check.

The operation check program of the testing device 13 receives the installation package (S31), installs the printer driver in the testing device 13 using the received installation package, and performs the operation check of the installed printer driver (S32). The operation check is performed by making the printer driver perform particular operations defined by the guarantee organization. The operation check program transmits test log data representing results of the operation check to the server 11 as a response to the operation check instruction received in S31 (S33).

The program 24 of the server 11 receives the test log data which is transmitted by the testing device 13 (S33). The program 24 transmits the received test log data, the installation package subject to the test and a package ID for identifying the installation package together to the guarantee organization as a set (S34). The package ID is, for example, one issued by the guarantee organization in advance and transmitted to the server 11, or one issued by the program 24 of the server 11. It is noted that the test log is an example of a result of the operation check. The package ID is an example of package identification information. The process of S34 to transmit the test log and the package ID to the guarantee organization is an example of a transmitting operation of result of the operation check, the custom installation package and the package ID.

Although processes executed by the guarantee organization are not illustrated using a flowchart, the guarantee organization determines whether the printer driver operates normally on the OS based on the received test log data. When it is determined that the printer driver normally operates on the OS, the guarantee organization incorporates guarantee information including the signature information and a hash value into the catalogue file, and generates the custom installation package including the catalogue file. Then, the guarantee organization transmits the thus generated custom installation package and the package ID to the server 11.

The program 24 of the server 11 receives the custom installation package and the package ID transmitted by the guarantee organization (S35: YES). It is noted that the process in S35 is an example of an obtaining operation of guarantee information guaranteeing the custom installation package and a receiving operation of the custom installation package and the package ID.

The program 24 of the server 11 identifies the received custom installation package using the package ID received in S35 (S36). The program 24 assigns installation package identification information to the identified custom installation package, and registers the installation package identification information with the first database, in a record newly generated in S14 (see FIG. 2A) and with the second database (see FIG. 2B) (S37) and terminates the obtaining process. The process in S37 is an example of a storing operation of the custom installation package including the guarantee information.

As shown in FIG. 3, after execution of the obtaining process, the program 24 of the server 11 generates obtaining information (S19), and transmits the generated obtaining information to the information processing device 12 (S20). The process of S20 is an example of a transmitting operation of obtaining information enabling a requesting device to obtain the custom installation package.

The obtaining information may be a program file of the custom installation package, a URL of the Webpage from which the custom installation package can be downloaded, a downloading code for download of the custom installation package, a URL of a Webpage or Webpage data of a Webpage in which the user can input a mailing address, or an input program in which the user can input a mailing address. Transmission of the obtaining information to the information processing device 12 is done using, for example, an e-mail. An e-mail address to which the obtaining information is transmitted is input, for example, through the customizing screen, by the user together with the user ID. Alternatively, the e-mail address to which the obtaining information is transmitted may be an e-mail address of the information processing device 12 (e.g., an e-mail address such that the information processing device 12 can receive an e-mail transmitted to the e-mail address), or an e-mail address of another information processing device such as a portable terminal, a personal computer and the like (e.g., an e-mail address such that the another information processing device can receive an e-mail transmitted to the e-mail address). The information processing device 12 and the another information processing device are examples of a plurality of information processing devices.

When the obtaining information is a URL, the user starts the browser 36 of the information processing device 12 and displays the Webpage designated by the URL on the display 43. Then, the user input the user ID through the user I/F 42 and downloads the custom installation package. It is noted that the Webpage designated by the URL may be provided by the server 11 or another server which is different from the server 11.

When the obtaining information is a URL of a Webpage or Webpage data representing a Webpage through which the mailing address can be input or a program with which the mailing address can be input, the user inputs, through the user I/F 42, the mailing address and a name to which a portable recording medium such as a CD-ROM in which the program data of the custom installation package is stored is to be transmitted. Then, the HTTP request including the input mailing address and the name is transmitted to the server 11. The program 24 of the server 11 outputs information for arrangement to forward the portable recording medium storing the custom installation package to the mailing address and the name included in the received HTTP request. For example, the program 24 displays the mailing address, the name and the installation package identification information on the display of the server 11. Alternatively, the program 24 transmits the mailing address, the name and the installation package information to a personal computer for ordering.

The user obtains the custom installation package by simply obtaining the same included in the obtaining information, accessing a Webpage designated by a URL included in the obtaining information to download the custom installation package or the like. Then, using the obtained custom installation package, the user installs the printer driver 34 in the information processing device 12.

The OS 33 of the information processing device inputs the hash value of the catalogue file of the custom installation package into a hash function. When it is determined that a return value is a particular value, the OS 33 starts installing the printer driver without displaying character strings such as "This program is not guaranteed. Do you want to continue installing the printer driver?" It is noted that the process of the OS 33 to install the printer driver is an example of an installing process.

On the other hand, when it is determined that the signature type included in the HTTP request is "vendor" (S17: "vendor"), the program 24 of the server 11 generates a custom installation package including the guarantee information of the vendor (S21). Specifically, the program 24 generates the custom installation package by incorporating the guarantee information of the vendor which has been stored, in advance, in the memory 22 into the catalogue file of the installation package generated in S16.

The program 24 of the server 11 adds installation package identification information to the custom installation package generated in S21 and registers the custom installation package with the record, which is newly generated in the first database in S14 (S22). It is noted that the installation identification information of the custom installation package generated in S21 is not registered with the second database. Only the custom installation packages guaranteed by the guarantee organization are registered with the second database.

After performing the process of S22, the program 24 of the server 11 performs the processes of S19 and S20 described above. As a result, the obtaining information which is generated in S19 and is used to obtain the custom installation package is transmitted to the information processing device 12.

The user obtains the custom installation package included in the obtaining information. Alternatively, the user obtains the custom installation package by downloading with use of the URL included in the obtaining information. Then, using the thus obtained custom installation package, the user installs the printer driver 34 in the information processing device 12.

The OS 33 of the information processing device 12 inputs the hash value of the catalogue file of the custom installation package in the hash function. When it is determined that the return value is not the particular value, the OS 33 displays character strings "This program is not guaranteed. Do you wish to continue installation?", an "OK" icon and an "CANCEL" icon on the display 43. When the user selects the "OK" icon through the user I/F 42, the OS 33 of the information processing device 12 starts installation of the printer driver.

On the other hand, when it is determined, in S15, that there exists, in the second database, a record having the same combination of the printer type and the print setting parameters as the combination included in the received HTTP request (S15: YES), the program 24 of the server 11 obtains by reading out the installation package identification information registered with the record (S23). That is, in response to existence of the custom installation package having a combination of the print setting parameters desired by the user and containing the guarantee information of the guarantee organization, the program 24 obtains the installation package identification information (23) indicating the user-desired custom installation package without performing the obtaining process (S18).

Next, the program 24 of the server 11 increments "the number of provisions" which is an item of a record from which the installation package identification information is read out. That is, by the item "the number of provisions", the number of times when the custom installation package is provided to the user is counted. For example, the number registered with the "the number of provisions" is used for providing the custom installation package of a newly released printer driver. For example, for the custom installation package of which a combination of the printer type and the print setting parameters exhibiting a relatively large number of provisions, the process of S18 is performed before the printer driver is released, and the custom installation package obtained from the guarantee organization is registered with the second database. As a result, regarding the custom installation package which is supposed to be requested by the user many times, the custom installation package including the guarantee information by the guarantee organization is provided to the user without performing the process in S18.

It is noted that the number of times indicated by "the number of provisions" may be displayed on a display (not shown) provided to the server 11. Further, the item and the record of the second database including the item "the number of provisions" may be included in the Webpage and published. The program 24 of the server 11 may display the second database including the item "the number of provisions" on the display of the server 11 in accordance with an input of instruction by an operator of the server 11. Further, the program 24 may include the second database in the Webpage.

After performing the process of S24, the program 24 of the server 11 performs the processes of S19 and S20, and then terminates the control process.

Effects of Illustrative Embodiment

According to the above-described illustrative embodiment of the present disclosures, the installation package of the printer driver which has been customized with a combination of a user-desired printer type and user-desired print setting parameters (hereinafter, referred to as a user-desired combination of print setting parameters) can be provided to the user with the guarantee information including the signature information.

According to the illustrative embodiment, in response to the HTTP request transmitted by the information processing device 12, the HTTP response, including the screen display data, is transmitted to the information processing device 12, thereby the customizing screen being displayed on the display 43 of the information displaying device 12. Then, it becomes possible that the user can input a user-desired combination of print setting parameters on the customizing screen so that the HTTP request including the user-desired combination of print setting parameters is transmitted. As a result, the user can obtain the user-desired combination of the print setting parameters.

Further, according to the illustrative embodiment, a displaying program such as the JavaScript is included in the screen display data transmitted to the information processing device 12. The displaying program has definition data which has the same content of the definition data the printer driver has. Therefore, the print setting cannot exceed settable ranges of the print setting parameters for the user-selected printer. As a result, it is prevented that the user requests for the custom installation package with inappropriate print setting.

According to the illustrative embodiment, the custom installation package obtained from the guarantee organization is registered with the second database. When the custom installation package containing the user-desired combination of the print setting parameters is registered with the second database, the custom installation package can be provided to the user without re-obtaining the same from the guarantee organization. Accordingly, a time period from receipt of the custom request to provision of the obtaining information of the custom installation package to the user can be shortened in comparison with a case where the custom installation package is re-obtained from the guarantee organization. Further, an excess operation (e.g., an operation check of the printer driver) to normally obtain the custom installation package from the guarantee organization can be omitted.

According to the illustrative embodiment, using the pulldown menu 53 of the customizing screen, the user is allowed to select whether to request for the custom installation package including the guarantee information of the guarantee organization or the custom installation package including the guarantee information of the vendor. As a result, the custom installation package containing the user-desired guarantee information can be provided to the user.

Further, according to the illustrative embodiment, when the user selects the "guarantee organization" with the pulldown menu 53 of the customizing screen, the character strings "It will takes a few days until guarantee of the guarantee organization is obtained", while when the user selects the "vendor" with the pulldown menu 53 of the customizing screen, the character strings "It will takes a few to several tens of minutes until guarantee of the vendor". With this configuration, it is possible to make the user recognize that a few days are necessary to obtain the custom installation package when the "guarantee organization" is selected, while a few to several tens of minutes are necessary to obtain the custom installation package when the "vendor" is selected. As a result, in comparison with a case where the message "It will takes a few to several tens of minutes until guarantee of the vendor" is not displayed, it becomes easier for the user to select the "guarantee organization" or the "vendor". Further, in comparison with a case where the message "It will takes a few days until guarantee of the guarantee organization is obtained" is not displayed, it becomes easier for the user to select the "guarantee organization" or the "vendor".

Further, according to the illustrative embodiment, the server 11 transmits the installation package and an operation-checking instruction to perform an operation check of the installation package to the testing device 13, receives the test log from the testing device 13 in response to the operation-checking instruction, requests for the custom installation package by transmitting the received test log to the guarantee organization, and receives the custom installation package from the guarantee organization in response to the request. According to the above configuration, an excess operation by the operator to input the installation package to the testing device 13 and to perform the operation check thereof, an excess work of the operator to transmit the installation package and the test log to the guarantee organization, and an excess work of the operator to obtain the custom installation package from the guarantee organization and input the same in the server 11 can be omitted. It is noted that instead of the process of S31, S33, S34 and S35 of FIG. 4, the operator may input the installation package in the testing device 13, the operator may transmit the installation package and the test log to the guarantee organization, or the operator may obtain the custom installation package from the guarantee organization and input the same in the server 11.

There exists a customizing program configured to customize the print settings of the printer driver installed in the information processing device 12. When a specification of the OS 33 is changed, there may occur a defect that such a customizing program may not detect existence of the printer driver installed in the information processing device 12. According to the illustrative embodiment, the installation package of the customized printer driver is provided to the user, such a customizing program for customizing the print settings of the printer driver installed in the information processing device becomes unnecessary. Accordingly, the above-described defect that the customizing program cannot detect the printer driver installed in the information processing device 12 would not occur.

[First Modification]

According to the above-described illustrative embodiment, the HTTP response containing the screen display data including the displaying program (e.g., JavaScript) is transmitted to the information processing device 12 in response to the HTTP request including the custom request. According to a first modification, a case where the HTTP response including a program file of an input program 35 (see FIG. 1) is transmitted to the information processing device 12 in response to the HTTP request including the custom request will be described.

When the HTTP request including the custom request is received (FIG. 3, S11: YES), the program 24 of the server 11 transmits the HTTP response containing the input program 35 to the information processing device 12 (S12). The program file of the input program 35 has been stored, in advance, in the memory 22. The process in S12 is an example of a transmitting operation of screen data of the parameter input screen, a transmitting operation of screen data of the printer driver selection screen and a transmitting operation of screen data of a guarantor selection screen.

The program file of the input program 35 included in the HTTP response the information processing device 12 received is configured to install the input program 35 in the information processing device 12. The input program installed in the information processing device 12 displays the customizing screen (see FIG. 5) on the display 43 of the information processing device 12. The process of generating the customizing screen to be displayed on the display 43 of the information processing device 12 is an example of a generating operation of screen data of the parameter input screen.

The input program 35 has the definition data which is described in the illustrative embodiment. The input program 35 displays, on the customizing screen, the text box 51 in which the user ID is to be input and a pulldown menu 52 which shows printer types. Then, in accordance with a selected one of the printer types shown in the pulldown menu 52, the input program 35 displays respective items of the print settings on the customizing screen with use of the definition data. The input program 35 refers to the definition data and determines a range of the print setting parameters of the pulldown menus 61-64 of respective items of the print setting as in the illustrative embodiment.

Further, the input program 35 displays, on the customizing screen, the "guarantee organization" and the "vendor" on the pulldown menu 53. Then, in response to the "guarantee organization" being selected from the pulldown menu 53, the input program 35 displays the character strings "It will takes a few days until guarantee of the guarantee organization is obtained" on the customizing screen. Alternatively, in response to the "vendor" being selected from the pulldown menu 53, the input program 35 displays the character strings "It will takes a few to several tens of minutes until guarantee of the vendor" on the customizing screen. The process in which the input program 35 receives the "guarantee organization" or the "vendor" from the pulldown menu 53 of the customizing screen is an example of an obtain operation of selection of one of a first guarantor and a second guarantor. Further, a process of displaying the character strings "It will takes a few days until guarantee of the guarantee organization is obtained" or "It will takes a few to several tens of minutes until guarantee of the vendor" on the customizing screen is an example of a displaying operation of a screen including a first period or a screen including a second period.

[Effects of First Modification]

By transmitting the input program 35 instead of the displaying program (e.g., JavaScript) to the information processing device 12, it is possible that the program 24 of the server 11 can obtain the user-desired combination of the print setting parameters.

Since the input program 35 includes the definition data, as in the illustrative embodiment described above, it is prevented that the user requests for the custom installation package with the inappropriate print settings.

[Second Modification]

In the above-described illustrative embodiment, a case where the displaying program (e.g., JavaScript) displays the pulldown menus and print settings on the customizing screen is described. It is noted that the program 24 of the server 11 may be configured to display the pulldown menus and the print settings on the customizing screen.

Specifically, when the HTTP request including the custom request is received, the program 24 transmits the HTTP response including the screen data of the customizing screen to the information processing device 12. Then, the browser 36 of the information processing device 12 displays the customizing screen on the display 43 using the image data included in the received HTTP response. When the pulldown menu 52 is selected on the customizing screen, the HTTP request including information indicating that the pulldown menu 52 is selected is transmitted to the server 11.

In accordance with the information include in the received HTTP request, the program 24 of the server 11 transmits the HTTP response including the screen data of the customizing screen including the printer types to the information processing device 12. The browser 36 of the information processing device 12 displays the customizing screen on the display 43 using the image data included in the received HTTP response. That is, the customizing screen including the selectable printer types is displayed on the display 43.

When the user selects the printer type, the HTTP request including information on the user-selected printer is transmitted to the server 11. The program 24 of the server 11 determines respective items of the print setting corresponding to the information indicating printer included in the received HTTP request and the definition data stored in the memory 22. The program 24 transmits, to the information processing device 12, the HTTP response including the screen data of the customizing screen containing the respective items of the print settings as determined.

The browser 36 of the information processing device 12 displays the customizing screen on the display 43 using the screen data included in the received HTTP response. That is, the customizing screen including the respective items of the print settings is displayed on the display 43.

When the user selects one of the pulldown menus 61-64, the HTTP request including information indicating the pulldown menu selected by the user is transmitted to the server 11. The program 24 of the server 11 determines the print setting parameters in accordance with the information indicating the pulldown menu included in the received HTTP request and the definition data stored in the memory 11. Then, the program 24 transmits the HTTP response including the screen data of the customizing screen containing the determined print setting parameters to the information processing device 12.

When the user selects the "OK" icon 54, the HTTP request including the user ID, the printer type, the signature type and the print setting parameters input through the customizing screen is transmitted to the server 11. The program 24 of the server 11 retrieves the user ID, the printer type, the signature type and the print setting parameters included in the received HTTP request.

[Effects of Second Modification]

By transmitting/receiving the HTTP request including the information on the user-selected contents through the customizing screen and the HTTP response including the screen data of the customizing screen corresponding to the information on the user-selected contents between the information processing device 12 and the server 11, it is possible to obtain the user-desired combination of the print setting parameters.

The program 24 of the server 11 transmits the screen data of the customizing screen indicating respective items of the print settings and print setting parameters corresponding to the selected printer type and the definition data stored in the memory 22 to the information processing device 12. Therefore, similarly to the illustrative embodiment, it is prevented that the user request for the custom installation package with inappropriate print settings.

[Third Modification]

According to a third modification, a case where character strings "The number of operations of the mouse increases by one through several times in comparison with a case where the guarantee organization is selected" are displayed on the customizing screen in addition to the character strings "It will take a few to several tens of minutes to obtain guarantee by the vendor" in response to selection of "vendor" from the pulldown menu will be described.

The displaying program according to the illustrative embodiment, or the input program 35 according to the first modification, the character strings "It will takes a few to several tens of minutes until guarantee of the vendor" and the character strings "The number of operations of the mouse increases by one through several times in comparison with a case where the guarantee organization is selected" are displayed on the customizing screen in response to the user's selection of the "vendor" from the pulldown menu 53. According to the second modification, when the program 24 of the server 11 receives the HTTP request including information indicating that the "vendor" is selected from the pulldown menu 53 of the customizing screen, the program 24 transmits the HTTP response including the screen data of the customizing screen containing the character strings "It will takes a few to several tens of minutes until guarantee of the vendor" and the character strings "The number of operations of the mouse increases by one through several times in comparison with a case where the guarantee organization is selected" to the information processing device 12.

[Effects on Third Modification]

The character strings "The number of operations of the mouse increases by one through several times in comparison with a case where the guarantee organization is selected" make the user recognize that, when the "vendor" is selected, the number of operations of the mouse increases by one through several times in comparison with a case where the guarantee organization is selected. In comparison with a case where the character strings "The number of operations of the mouse increases by one through several times in comparison with a case where the guarantee organization is selected" are not displayed, selection of the "guarantee organization" and the "vendor" is made easier. It is note that the character strings "The number of operations of the mouse increases by one through several times in comparison with a case where the guarantee organization is selected" an example of operation information. Further, a process of displaying the character string "The number of operations of the mouse increases by one through several times in comparison with a case where the guarantee organization is selected" on the display 43 is an example of a displaying operation of a screen including the operation information.

[Fourth Modification]

According to a fourth modification, an example will be described in which, when the user selects the "guarantee organization" from the pulldown menu of the customizing scree, the custom installation package including the guarantee information of the vendor is transmitted before the custom installation package including the guarantee information of the guarantee organization. For example, an administrator managing a plurality of printers may wish that the operation check of the custom installation package before it is installed to the plurality of printers. According to a fourth modification, in such a case, the custom installation package including the guarantee information of the vendor is transmitted to the information processing device 12 before the custom installation package including the guarantee information of the guarantee organization is transmitted.

For example, on the pulldown menu 53 of the customizing screen, "guarantee organization and vendor" is displayed in addition to "guarantee organization" and "vendor" as selectable items. When the user selects "guarantee organization and vendor" from the pulldown menu 53 of the customizing screen, for example, character strings "You can obtain the installation package guaranteed by the vendor before you obtain the installation package guaranteed by the guarantee organization" are displayed on the customizing screen. The character strings "You can obtain the installation package guaranteed by the vendor before you obtain the installation package guaranteed by the guarantee organization" make the administrator, who is a user, recognize that the user can obtain the installation package guaranteed by the vendor before the user obtains the installation package guaranteed by the guarantee organization. Thus, the user can select the "guarantee organization and vendor" easier in comparison with a case where such character strings are not displayed.

When the "guarantee organization and vendor" is selected from the pulldown menu 53 of the customizing screen, the HTTP request including the information indicating that the "guarantee organization and vendor" is selected and print setting parameters is transmitted to the server 11. In response to the received HTTP request including information indicating that the "guarantee organization and vendor" is selected, the program 24 of the server 11 performs the processes of S21, S22, S19 and S20. That is, the program 24 generates the custom installation package including the guarantee information of the vendor (S21), registers the generated custom installation package with the first database, generates the obtaining information for the generated custom installation package, and transmits the generated obtaining information to the information processing device 12 by e-mail or the like.

The program 24 of the server 11 performs the obtaining process in S18 to obtain the custom installation package including the guarantee information of the guarantee organization. It is noted that the time period necessary to obtain the custom installation package including the guarantee information of the vendor is a few minutes, while the time period necessary to obtain the custom installation package including the guarantee information of the guarantee organization is a few days. Thus, the custom installation package including the guarantee information of the guarantee organization is obtained after the obtaining information of the custom installation package including the guarantee information of the vendor has been transmitted to the information processing device 12.

[Effects of Fourth Modification]

According to the fourth modification, the user, who is also the administrator, installs the printer driver, which is customized using the custom installation package previously obtained and guaranteed by the vendor, in the information processing device 12 and performs the operation check of the printer driver. Thereafter, it becomes possible that a printer driver of the custom installation package guaranteed by the guarantee organization can be installed in a plurality of information processing devices.

It is noted that, after the obtaining information for the custom installation package guaranteed by the vendor is transmitted to the information processing device 12, the HTTP request including information to cancel transmission of the obtaining information for the custom installation package guaranteed by the guarantee organization may be received from the user. For example, the displaying program explained in the description of the illustrative embodiment, and the input program 35 explained in the description of the first modification, may be configured to display a cancelling screen for cancelling transmission of the obtaining information for the custom installation package guaranteed by the guarantee organization on the display 43 of the information processing device 12. In the cancelling screen, when an instruction to cancel the transmission of the obtaining information for the custom installation package guaranteed by the guarantee organization is input by the user, the HTTP request including the instruction (for cancelling the obtaining information) is transmitted to the server 11. The program 24 of the server 11 cancels the transmission of the obtaining information for the custom installation package guaranteed by the guarantee organization in accordance with the instruction included in the HTTP request.

[Other Modifications]

In the illustrative embodiment, the information processing device 12, to which the printer driver 34 is to be installed, transmits the HTTP request including the custom request. However, the HTTP request including the custom request may be transmitted by an information processing device other than the information processing device 12. For example, the user may transmit the HTTP request including the custom request using other information processing devices such as a mobile terminal or a personal computer. The server 11 transmits the HTTP response including the screen display data to the information processing device which has transmitted the HTTP request including the custom request. The user may input the user's e-mail address or an e-mail address of the information processing device 12 on the customizing screen displayed on the other information processing device such as the mobile terminal or the personal computer. The custom installation package is transmitted to the thus input e-mail address. That is, the obtaining information is transmitted to the information processing device 12 or the other information processing device such as the mobile terminal or the personal computer. The mobile terminal or the personal computer which transmits the HTTP request including the custom request is an example of a requesting device.

In the illustrative embodiment, a case where the displaying program (e.g., JavaScript) is transmitted to the information processing device 12 is described. However, the configuration may be modified such that a code to be read by the CPU executing the JavaScript provided to the browser 36 of the information processing device 12 may be transmitted.

Further, in the illustrative embodiment, a case where the program 24 of the server 11 obtains the custom installation package including the guarantee information itself from the guarantee organization is described. Alternatively, the program 24 of the server 11 may obtain the catalogue file, which is the guarantee information, from the guarantee organization, and the program 24 may generate the custom installation package with incorporating the obtained catalogue file in the installation package.

In the illustrative embodiment, the example is described in which respective items of the printer settings and the pulldown menus 61-64 are display on a right-hand side of the customizing screen in response to selection of the printer type from the pulldown menu 52 of the customizing screen. Alternatively, instead of display of the text box 51 and the pulldown menus 52 and 53, respective items of the print settings and the pulldown menus 61-64 are displayed on an entire area of the customizing screen in response to the printer type being selected from the pulldown menu 52 of the customizing screen.

Further, in the illustrative embodiment, a case where the HTTP request including the print setting parameters and the signature type is transmitted to the server 11 is described. Alternatively, the HTTP request including the print setting parameters but does not contain the signature type may be transmitted to the server 11. Specifically, when the custom installation package including the user-desired combination of print setting parameters and including the guarantee information of the guarantee organization is registered with the second database, since it does not take a few days to obtain the custom installation package, it is unnecessary to make the user select "guarantee organization" or the "vendor". When it is determined that the custom installation package having the user-desired combination of the print setting parameters included in the received HTTP request is registered with the second database, the program 24 of the server 11 transmits the obtaining information for obtaining the custom installation package registered with the second database to the information processing device 12. On the other hand, when it is determined that the custom installation package having the combination of the print setting parameters included in the received HTTP request is not registered with the second database, the program 24 transmits, to the information processing device 12, the HTTP response including an instruction to display the pulldown menu 53 to select the signature type on the customizing screen. The displaying program of the information processing device displays the pulldown menu 53 to select the signature type on the customizing screen in accordance with the instruction included in the HTTP response.

In the illustrative embodiment, a case where the combination of the printer type and the print setting parameters is transmitted from the information processing device 12 to the server 11 is described. Alternatively, an installation package of the printer driver customized with user-desired parameter combination (without the guarantee information) may be transmitted from the information processing device 12 to the server 11.

In the illustrative embodiment, a case where the print setting parameters are input to the information processing device 12 through the user I/F 42 on the customizing screen is described. Alternatively, the print setting parameters may be input through the printer 10. For example, the printer 10 may be provided with a touch panel and/or operation buttons through which the print setting parameters may be input, and thus input print setting parameters may be transmitted to the information processing device 12 through the local network 99. Then, the information processing device 12 transmits the HTTP request including the print setting parameters received from the printer 10 to the sever 11. The program 24 of the server 11 may retrieve the print settings included in the received HTTP request.

In the illustrative embodiment, a case where the operation check of the customized printer driver is performed by the testing device 13 is described. Alternatively, the operation check of the customized printer driver may be performed by the program 24 of the server 11.

The memory 22 described in the description of the illustrative embodiment may be a storage on a network which is communicatable with the server 11 through the Internet 100. The storage on the network may be provided by, for example, a storage server.

In the illustrative embodiment, a case where the print settings are included in the second database shown in FIG. 2B is described. Alternatively, since the print settings are included in the first database shown in FIG. 2A, the print settings in the second database may be omitted. The program 24 may obtain the record of the installation package identification information same as the installation package identification information registered with the second database by reading out from the first database in S15. That is, the program 24 obtains the print settings corresponding to the respective records registered with the second database by retrieving the same from the first database. The program 24, in S15, determines whether the print setting obtained by retrieving from the first database and the combination of the print setting parameters obtained in S13 are the same.

What is claimed is:

1. An installer customizing system comprising a server and a requesting device connected to the server through the Internet,
   wherein the server comprises:
   a memory; and
   a controller configured to perform:
      receiving a print setting parameter to be associated with an installation package of print software from the requesting device, the print software being configured to cause an information processing device to perform a print instruction process for causing a printer to perform printing, the installation package being software aggregation configured to cause the information processing device on which an operating system is running to perform an installation process of installing the print software in the information processing device such that the print software operates on the operating system, the print setting parameter being associated with the print software in the installation process such that the print software operates in accordance with the print setting parameter;
      obtaining the installation package;
      obtaining guarantee information guaranteeing a custom installation package which is the obtained installation package associated with the received print setting parameter, the guarantee information including signature information indicating a guarantor guaranteeing the custom installation package, the guarantee information being not received from the requesting device when the print setting parameter is received from the requesting device;
      storing the custom installation package including the obtained guarantee information in the memory; and transmitting obtaining information enabling the requesting device to obtain the custom installation package stored in the memory to the requesting device through the Internet.

2. The installer customizing system according to claim 1, wherein the installation package is software aggregation configured to cause each of a plurality of the information processing devices to perform the installation process, and
wherein the requesting device is one of the plurality of the information processing devices configured to perform the installation process.

3. The installer customizing system according to claim 1, wherein the controller is configured to perform:
transmitting, to the requesting device through the Internet, screen data of a parameter input screen configured to accept an input of the print setting parameter; and
receiving, through the Internet, the print setting parameter input on the parameter input screen after transmitting the screen data of the parameter input screen.

4. The installer customizing system according to claim 3, wherein definition of a default value of the print setting parameter and a range of the print setting parameter is set in the print software for each type of the print software, and
wherein the controller is configured to perform transmitting the screen data of the parameter input screen on which a screen of at least one of the default value and the range is restricted in accordance with the definition corresponding to the type of the print software.

5. The installer customizing system according to claim 4, wherein the controller is configured to perform:
in response to request from the requesting device, transmitting screen data of a program selection screen configured to accept selection of the type of the print software to the requesting device through the Internet;
after transmitting the screen data of the program selection screen, generating the screen data of the parameter input screen on which a screen is restricted in accordance with the definition corresponding to the type of the print software selected through the program selection screen; and
transmitting the screen data of the parameter input screen through the Internet.

6. The installer customizing system according to claim 5, wherein, in the print software, the definition of the default value of the print setting parameter and the range of the print setting parameter are set by definition data included in the installation package of the print software, and
wherein the controller is configured to perform referring to the definition data, which is included in the installation package of the print software selected through the program selection screen, of the print software selected through the program selection screen, and generating the screen data of the parameter input screen on which a screen is restricted in accordance with the definition corresponding to the type of the print software selected through the program selection screen.

7. The installer customizing system according to claim 5, wherein the set of particular instructions cause the requesting device to obtain selection of one of a first guarantor and a second guarantor through a user interface of the requesting device, the first guarantor being a guarantee organization authorized by a vendor of the operating system, the second guarantor being a vendor of the print software, and
wherein the set of particular instructions cause the requesting device to display a screen including operation information indicating operation necessary to install the print software when the requesting device obtains selection of the second guarantor.

8. The installer customizing system according to claim 3, wherein the controller is configured to perform transmitting, to the requesting device through the Internet, a set of particular instructions for realizing an input program as the screen data, the set of particular instructions causing the requesting device to display the parameter input screen configured to accept the input of the print setting parameter.

9. The installer customizing system according to claim 8, wherein definition of a default value of the print setting parameter and a range of the print setting parameter is set in the print software for each type of the print software, and
wherein the controller is configured to perform transmitting the set of particular instructions causing the requesting device to display the parameter input screen on which a screen of at least one of the default value and the range is restricted in accordance with the definition corresponding to the type of the print software.

10. The installer customizing system according to claim 9, wherein the controller is configured to perform transmitting the set of particular instructions causing the requesting device to display a program selection screen configured to accept selection of a type of the print software and to display the parameter input screen on which a screen is restricted in accordance with the definition corresponding to the type of the print software selected through the program selection screen.

11. The installer customizing system according to claim 10,
wherein, in the print software, the definition of the default value of the print setting parameter and the range of the print setting parameter is set in accordance with definition data included in the installation package of the print software, and
wherein the controller is configured to perform transmitting the definition data included in the installation package with the set of particular instructions to the requesting device,
wherein the set of particular instructions cause the requesting device to refer to the definition data, which is included in the installation package of the print software selected through the program selection screen, of the print software selected through the program selection screen and generate the screen data of the parameter input screen on which a screen is restricted in accordance with the definition corresponding to the type of the print software selected through the program selection screen.

12. The installer customizing system according to claim 8, wherein the set of particular instructions cause the requesting device to obtain selection of one of a first guarantor and a second guarantor through a user interface of the requesting device, the first guarantor being a guarantee organization authorized by a vendor of the operating system, the second guarantor being a vendor of the print software, and wherein the set of particular instructions cause the requesting device to display a screen including a first period necessary to transmit the obtaining information on a display of the requesting device in response to the requesting device obtaining selection of the first guarantor, and display a screen including a second period necessary to transmit the obtaining information on a display of the information processing device in response to the requesting device obtaining selection of the second guarantor.

13. The installer customizing system according to claim 1,
wherein the guarantor is a guarantee organization authorized by a vendor of the operating system,
wherein the controller is configured to perform receiving the guarantee information issued by the guarantee organization from the guarantee organization.

14. The installer customizing system according to claim 13,
wherein the controller is configured to perform:
obtaining the custom installation package including the obtained guarantee information and storing the custom installation package including the obtained guarantee information in the memory;
determining whether the received print setting parameter is coincide with the print setting parameter associated with the custom installation package stored in the memory;
in response to determining that the received print setting parameter is coincide with the print setting parameter associated with the custom installation package stored in the memory, transmitting the obtaining information enabling the requesting device to obtain the custom installation package stored in the memory to the requesting device;
in response to determining that the received print setting parameter is not coincide with the print setting parameter associated with the custom installation package stored in the memory:
obtaining new guarantee information;
storing a new custom installation package including the new guarantee information in the memory; and
transmitting new obtaining information enabling the requesting device to obtain the new custom installation package stored in the memory to the requesting device.

15. The installer customizing system according to claim 13,
wherein the controller is configured to perform:
transmitting, to the requesting device through the Internet, screen data of a guarantor selection screen configured to accept selection of one of a first guarantor and a second guarantor, the first guarantor being the guarantee organization authorized by the vendor of the operating system, the second guarantor being a vendor of the print software;
obtaining the guarantee information from the guarantee organization in response to selection of the first guarantor through the guarantor selection screen;
obtaining the guarantee information by generating the guarantee information in response to selection of the second guarantor through the guarantor selection screen;
storing the custom installation package including the guarantee information obtained from the guarantee organization in response to obtaining the guarantee information from the guarantee organization; and storing the custom installation package including the generated guarantee information in response to obtaining the guarantee information by generating the guarantee information.

16. The installer customizing system according to claim 15,
wherein the controller is configured to perform transmitting the screen data of the guarantor selection screen configured to cause the requesting device to display a first period necessary to transmit the obtaining information.

17. The installer customizing system according to claim 15,
wherein the controller is configured to perform transmitting the screen data of the guarantor selection screen configured to cause the requesting device to display a screen including operation information indicating operation necessary to install the print software when the second guarantor is selected through the guarantor selection screen.

18. The installer customizing system according to claim 15,
wherein, in response to the requesting device obtaining selection of the first guarantor, the controller performs:
obtaining the custom installation package by generating the custom installation package including the guarantee information guaranteed by the second guarantor;
transmitting, to the requesting device, the obtaining information enabling the requesting device to obtain the custom installation package including the guarantee information guaranteed by the second guarantor;
obtaining the custom installation package including the guarantee information guaranteed by the first guarantor after transmitting the obtaining information to the requesting device; and
transmitting, to the requesting device, the obtaining information enabling the requesting device to obtain the custom installation package including the guarantee information guaranteed by the first guarantor.

19. The installer customizing system according to claim 13,
wherein the controller is configured to perform:
executing one of operation check of the custom installation package and instruction of execution of the operation check;
transmitting, to the guarantee organization, result of the operation check, the custom installation package of which operation is checked and package identification information identifying the custom installation package; and
receiving the custom installation package and the package identification information from the guarantee organization.

20. A server comprising:
a memory; and
a controller configured to perform:
receiving a print setting parameter to be associated with an installation package of print software from a requesting device through the Internet, the print software being configured to cause an information processing device to perform a print instruction process for causing a printer to perform printing, the installation package being software aggregation configured to cause the information processing device on which an operating system is running to perform an installation process of installing the print software in the information processing device such that the print software operates on the operating system, the print setting parameter being associated with the print software in the installation process such that the print software operates in accordance with the print setting parameter;

obtaining the installation package;

obtaining guarantee information guaranteeing a custom installation package which is the obtained installation package associated with the received print setting parameter, the guarantee information including signature information indicating a guarantor guaranteeing the custom installation package, the guarantee information being not received from the requesting device when the print setting parameter is received from the requesting device;

storing the custom installation package including the obtained guarantee information in the memory; and transmitting obtaining information enabling the requesting device to obtain the custom installation package stored in the memory to the requesting device through the Internet.

21. A method of controlling a server, the method including:

receiving a print setting parameter to be associated with an installation package of print software from a requesting device through the Internet, the print software being configured to cause an information processing device to perform a print instruction process for causing a printer to perform printing, the installation package being software aggregation configured to cause the information processing device on which an operating system is running to perform an installation process of installing the print software in the information processing device such that the print software operates on the operating system, the print setting parameter being a parameter associated with the print software installation process such that the print software operates in accordance with the print setting parameter;

obtaining the installation package;

obtaining guarantee information guaranteeing a custom installation package which is the obtained installation package associated with the received print setting parameter, the guarantee information including signature information indicating a guarantor guaranteeing the custom installation package, the guarantee information being not received from the requesting device when the print setting parameter is received from the requesting device;

storing the custom installation package including the obtained guarantee information in a memory of the server; and transmitting obtaining information enabling the requesting device to obtain obtaining the custom installation package stored in the memory to the requesting device through the Internet.

* * * * *

UNITED STATES PATENT AND TRADEMARK OFFICE
CERTIFICATE OF CORRECTION

PATENT NO. : 10,983,737 B2
APPLICATION NO. : 16/407386
DATED : April 20, 2021
INVENTOR(S) : Ryota Kakitsuba It is certified that error appears in the above-identified patent and that said Letters Patent is hereby corrected as shown below:

On the Title Page

(57) Abstract Line 4 should read:
installation package of print software from the requesting In the Claims Column 27, Claim 14, Line 26 should read:
eter is coincident with the print setting parameter Column 27, Claim 14, Line 30 should read:
setting parameter is coincident with the print setting Column 27, Claim 14, Line 37 should read:
setting parameter is not coincident with the print Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*